United States Patent [19]

Finocchiaro

[11] Patent Number: 5,679,395
[45] Date of Patent: *Oct. 21, 1997

[54] FAT FREE, REDUCED FAT AND LOW FAT MARGARINE-LIKE SPREADS AND CREAM CHEESE

[75] Inventor: Eugene Terry Finocchiaro, Milton, Mass.

[73] Assignee: Opta Food Ingredients, Inc., Bedford, Mass.

[*] Notice: The portion of the term of this patent subsequent to Dec. 17, 2013, has been disclaimed.

[21] Appl. No.: 324,511

[22] Filed: Oct. 14, 1994

Related U.S. Application Data

[63] Continuation-in-part of Ser. No. 138,541, Oct. 15, 1993, Pat. No. 5,470,391, which is a continuation-in-part of Ser. No. 900,899, Jun. 18, 1992, abandoned.

[51] Int. Cl.$^6$ ............................................................. A23C 19/00
[52] U.S. Cl. ......................... 426/582; 426/580; 426/601; 426/603; 426/658; 426/661; 426/663; 127/38
[58] Field of Search ............................ 426/582, 658, 426/661, 34, 36, 580, 585, 601, 602, 603, 663; 127/38

[56] References Cited

U.S. PATENT DOCUMENTS

| | | | |
|---|---|---|---|
| H1395 | 1/1995 | Prosser | 426/633 |
| 3,086,890 | 4/1963 | Sarko et al. | 127/69 |
| 3,238,064 | 3/1966 | Macarus et al. | 127/69 |
| 3,515,591 | 6/1970 | Feldman | |
| 3,962,465 | 6/1976 | Richter et al. | 426/48 |
| 3,986,890 | 10/1976 | Richter et al. | 127/38 |
| 4,280,851 | 7/1981 | Pitchon et al. | 127/33 |
| 4,427,709 | 1/1984 | Guhl et al. | 426/578 |
| 4,499,116 | 2/1985 | Zwiercan et al. | 426/582 |
| 4,510,166 | 4/1985 | Lenchin et al. | 426/582 |
| 4,568,555 | 2/1986 | Spanier | 426/582 |
| 4,594,255 | 6/1986 | Wilson et al. | 426/578 |
| 4,608,265 | 8/1986 | Zwiercan et al. | 426/582 |
| 4,623,549 | 11/1986 | Katt et al. | 426/548 |
| 4,695,475 | 9/1987 | Zwiercan et al. | 426/582 |
| 4,917,915 | 4/1990 | Cain et al. | 426/573 |
| 4,937,091 | 6/1990 | Zallie et al. | 426/582 |
| 4,956,193 | 9/1990 | Cain et al. | 426/573 |
| 4,971,723 | 11/1990 | Chiu | 426/578 X |
| 5,108,773 | 4/1992 | Smith et al. | 426/582 |
| 5,180,604 | 1/1993 | Crane et al. | 426/582 |
| 5,208,061 | 5/1993 | de Coninck et al. | 426/573 |
| 5,250,316 | 10/1993 | Harris | 426/573 |
| 5,275,837 | 1/1994 | Eastman | 426/661 |
| 5,281,432 | 1/1994 | Zallie et al. | 426/549 |
| 5,338,560 | 8/1994 | Wesdorp et al. | 426/573 |
| 5,372,835 | 12/1994 | Little et al. | 426/573 |
| 5,374,442 | 12/1994 | Harris et al. | 426/573 |
| 5,387,426 | 2/1995 | Harris et al. | 426/573 |
| 5,395,640 | 3/1995 | Harris et al. | 426/573 |
| 5,436,019 | 7/1995 | Harris et al. | 426/573 |
| 5,470,391 | 11/1995 | Mallee et al. | 127/38 |
| 5,501,869 | 3/1996 | Buliga et al. | 426/658 |
| 5,584,937 | 12/1996 | Finocchiaro | 127/38 |

FOREIGN PATENT DOCUMENTS

| | | |
|---|---|---|
| 2047266 | 7/1991 | Canada |
| 0120498 | 10/1984 | European Pat. Off. |
| 120498A3 | 10/1984 | European Pat. Off. |
| 0298561 | 7/1988 | European Pat. Off. |
| 0 366 898 | 5/1990 | European Pat. Off. |
| 0366898 | 5/1990 | European Pat. Off. |
| 648425A2 | 4/1991 | European Pat. Off. |
| 0480433 | 4/1992 | European Pat. Off. |
| 0516107 | 5/1992 | European Pat. Off. |
| 0495407 | 7/1992 | European Pat. Off. |
| 495407A1 | 7/1992 | European Pat. Off. |
| 0529892 | 3/1993 | European Pat. Off. |
| 529892A1 | 3/1993 | European Pat. Off. |
| 0554818 | 8/1993 | European Pat. Off. |
| 554818A2 | 8/1993 | European Pat. Off. |
| 590203A1 | 4/1994 | European Pat. Off. |
| 93/03629 | 3/1993 | WIPO |
| 93/03630 | 3/1993 | WIPO |
| 93/25084 | 12/1993 | WIPO |
| 94/05163 | 3/1994 | WIPO |
| 94/09645 | 5/1994 | WIPO |

*Primary Examiner*—Leslie Wong
*Attorney, Agent, or Firm*—Hamilton, Brook, Smith & Reynolds, P.C.

[57] ABSTRACT

Substantially fat free, reduced fat and low fat margarine-like spreads, dairy spreads and cream cheeses that have the taste, mouthfeel and textural properties of equivalent full fat spreads are described. The spreads contain a starch based texturizing agent that is derived from pregelatinized, high amylose starch. The presence of the texturizing agent functions to viscosify the spread in the absence of traditional viscosifying or thickening agents, such as gelatin and emulsifiers.

32 Claims, No Drawings

FAT FREE, REDUCED FAT AND LOW FAT MARGARINE-LIKE SPREADS AND CREAM CHEESE

RELATED APPLICATIONS

This is a continuation-in-part of U.S. patent application Ser. No. 08/138,541, filed Oct. 15, 1993, now U.S. Pat. No. 5,470,391 which is a continuation-in-part of U.S. patent application Ser. No. 07/900,899, filed Jun. 18, 1992, now abandoned. The entire teachings of each application are incorporated herein by reference.

BACKGROUND OF THE INVENTION

Margarine-like spreads are edible plastic dispersions that typically have a continuous fat phase that is plasticized. High fat content is necessary to achieve the desired texture and organoleptic properties of spreads. Spreads typically contain milk proteins, emulsifiers, fat/oils, salt and preservatives/flavoring agents. Reduction of fat content without compromising the textural properties of a spread has been the focus of much research. In order to produce reduced fat spreads, the addition of a gelling agent is typically added to stabilize the spread in order to compensate for the fat reduction.

Cream cheese is a soft, mild acid-coagulated uncured cheese made of cream or from a mixture of cream and milk. Cream cheese is stored under refrigeration conditions and the body of cream cheese is smooth and butter-like. The texture and body of cream cheese at refrigeration temperatures is such that the cream cheese can be sliced and spread. In making cream cheese, sweet whole milk and/or skim milk and sweet cream are blended in pre-selected proportions to form a cream cheese mix. The cream cheese mix normally has a butterfat content of from about 10% to about 14%. After processing, the finished cream cheese has a butterfat content of from about 33% to about 35% by weight.

The consumer demand for low-fat foods that retain the quality of the corresponding full-fat formulation has led to the development of a large number of potential texturizing agents and fat replacers based on proteins, polyesters, and a variety of other approaches. Several examples of fat replacers derived from starch include: a partially de-branched starch used for providing fat-like texture, forming opaque clouds and producing thermoreversible gels (EP Application 0 372 184 A1 and U.S. Pat. No. 4,971,723 issued to Chiu); cold-water soluble and pregelatinized converted starches (by acid, enzyme or oxidation treatment) for use as fat or oil replacement in ice cream and mayonnaise (U.S. Pat. No. 4,510,166 issued to Lenchin et al.); enzyme-hydrolyzed thermoreversible starch gels as fat substitutes in mayonnaise, cream cheese, whipped cream and meat applications (U.S. Pat. Nos. 3,962,465 and 3,986,890 issued to Richter et al.); aqueous dispersion of granular starch hydrolysate (EP Application 0 443 844 A1 issued to Chiu et al.); macrocolloid carbohydrate particles for use in ice cream, yogurt, salad dressings, mayonnaise, coffee whitener and sour cream (PCT Application WO 89/12403 to Singer et al.); two-phase protein and carbohydrate fat substitute for use in salad dressings and cookie fillings (EP Application 0 441 494 A1 to Reimer); fat substitute comprising hydrated alginate and a complex carbohydrate (PCT Application WO 92/02147 to Shemer and Shemer); mixture of heat treated microcrystalline cellulose and xanthan gum used as a fat mimetic in frozen desserts and viscous and pourable salad dressings (PCT Application WO 91/02463 to Baer et al.); and insoluble modified starch used as a bulking agent, filler or texturizing agent in low-fat formulations (U.S. Pat. No. 5,051,271 issued to Iyengar et al.).

A number of methods have been developed to modify starches for use in food formulations and include: subjecting defatted amylose containing starch to high temperature and shear to disrupt the starch granules thereby producing a gel (U.S. Pat. No. 3,666,557 issued to Jensen and Long); cooking high amylose starch at 140°–170° C. to produce a solubilized cold water dispersible starch (U.S. Pat. No. 3,515,591 issued to Feldman et al.); cooking high amylose starch under shear at a temperature higher than the gelatinization temperature to produce a yellow gel (U.S. Pat. No. 3,836,677 issued to Freck et al.); and subjecting high amylose starches to a jet cooking/spray drying process to produce a pregelatinized starch (E.P. Application 0 366 898 A1 and U.S. Pat. No. 5,131,953 issued to Kasica and Eden).

There have been many efforts to provide margarine-like spreads and cream cheese which has the texture, smoothness and organoleptic properties of spreads and cream cheese, but with reduced levels of fat. However, the rheology of full fat spreads have proven difficult to achieve with current ingredient technology. Most advances involve a complex mixture of ingredients including starch, gelatin, emulsifiers and gum. These systems unfortunately require complex processing and functionally result in products that exhibit poor "spreadability" with chalky mouthfeel and strong off-flavors. A non-fat cream cheese product containing micro-crystalline cellulose has been described (U.S. Pat. No. 5,108,773 issued to Smith et al.).

It is desirable to produce a simpler formulation and manufacturing process which results in spreads and cream cheese that have the theology, taste and texture of full fat products with virtually no off-flavors.

SUMMARY OF THE INVENTION

This invention relates to substantially fat free, reduced fat and low fat margarine-like spreads, dairy spreads and cream cheeses which are collectively referred to herein as "spreads". The spreads have the taste, mouthfeel and textural properties of equivalent full fat spreads. The spreads comprise starch and a starch based texturizing agent that is derived from pregelatinized, high amylose starch which has a dextrose equivalent (DE) value for the starch component of less than about 5, with less than 1.5 being preferred. A preferred starch based texturizing agent is one which is derived from high amylose starch that has been pregelatinized and spray dried into a powder which is retrograded and crystalline; partially retrograded crystalline; or nonretrograded and noncrystalline. A preferred starch is maltodextrin. The spreads can further comprise adjunct ingredients, such as milk solids, emulsifying salts, polydextrose, fat (as heavy cream or liquid oil), proteins and titanium dioxide, to modify physical and organoleptic properties.

The presence of the texturizing agent functions to viscosify the spread in the absence of traditional viscosifying or thickening agents such as gelatin, emulsifiers and hydrocolloids. Elimination of such ingredients will reduce or eliminate complex processing requirements and will reduce manufacturing costs. Reduction in fat content translates into reduction in overall calories of the finished product.

DETAILED DESCRIPTION OF THE INVENTION

This invention relates to substantially fat free, reduced fat and low fat margarine-like spreads, dairy spreads and cream cheeses which are collectively referred to herein as "spreads". The spreads have the taste, mouthfeel and textural properties of full fat spreads. The spreads comprise starch and a starch based texturizing agent that is derived from pregelatinized, high amylose starch. The spreads can further comprise adjunct ingredients, such as milk solids, emulsifying salts, polydextrose, fat (as heavy cream or liquid oil), proteins and titanium dioxide, to modify physical and organoleptic properties.

The terms "non-fat" and "fat free" are intended to mean herein a spread that contains less than 0.5 grams total fat per 15 grams serving for spreads and 0.5 grams total fat per 30 gram serving for cream cheese. The term "reduced fat" is intended to mean herein a spread having greater then or equal to a 25% reduction in fat compared to the full fat equivalent. The term "low fat" is intended to mean a spread that contains 3 grams total fat per 50 gram serving. These levels of fat are consistent with the definitions of "fat free", "reduced fat" and "low fat" as set forth by the Nutrition Labeling and Education Act (NLEA), Federal Register, Jan. 6, 1993.

For purposes of the present invention, the term "starch based texturizing agent" will be used to describe products derived from pregelatinized, high amylose (greater than about 30% by weight amylose as determined by iodine binding) starch that have a dextrose equivalent (DE) value for the starch component itself of less than about 5, with about 1.5 being preferred as determined by the Luff-Schoorl method, Procedure D52, Corn Industry's Research Foundation, 6th Edition. Any source of pregelatinized, high amylose starch can be used, such as pea, barley and corn. However, use of an excipient with the high amylose starch is desired in order to adequately hydrate the starch for use in the spread formulation.

Methods for making preferred texturizing agents are described in detail in U.S. Pat. No. 5,470,391 published PCT Application No. WO 95/10196, and U.S. Pat. No. 5,584,937. The teachings of these applications are incorporated herein by reference in their entirety. According to these methods, excipients can be incorporated into the final texturizing agent to aid in hydration of the texturizing agent. When an excipient is incorporated into the starch based texturizing agent, the DE value will vary depending upon the amount and type of excipient that is used. Incorporation of about 25% by weight maltodextrin as excipient results in a product with good properties for this application. Examples of commercially available maltodextrins include M040 (DE value of 4–8) and M100 (DE of 10), both of which are produced by Grain Processing Corporation.

In addition to the starch based texturizing agent, starch is added to a spread formulation in order to enhance the gel strength of the final product. The term "starch" is intended herein to mean any starch which is a hydrolyzed starch (e.g., maltodextrin), granular starch or nongranular starch. For example, the presence of maltodextrin, beyond that which is added as part of the starch based texturizing agent, serves as a thickening/gelling agent. The preferred amount of maltodextrin is about 20 percent by weight. Maltodextrin levels can be adjusted upward or downward to give textures ranging from a stick margarine to a soft spreadable tub product to a pourable, squeezable product. The amount of maltodextrin will depend upon the desired end product and can be readily ascertained by one skilled in the art.

A non-fat margarine-like spread can be prepared using the starch based texturizing agent. This non-fat spread is unlike traditional margarine-like spreads because it can be made without an oil phase. The presence of the starch based texturizing agent functions to gel the spread ingredients without the need for traditional viscosifying or thickening agents such as gelatin, emulsifiers and hydrocolloids such as carrageenans, pectin, alginate, agar and gellan. The resultant margarine-like spread has a fat like rheology similar to full fat equivalents. The non-fat spreads can be made without dairy ingredient(s) or can contain non-fat dairy ingredients such as skim milk, skim butter milk, skim milk powder and milk protein isolates (e.g., caseinates, whey protein isolates and/or concentrates).

Preparation of a non-fat margarine does not require complex manufacturing techniques or equipment. It is preferred that the texturizing agent be added to heated water, under high shear, to facilitate adequate solubilization. The amount of texturizing agent is from about 1 percent to about 6 percent by weight, with about 3 percent being preferred. The margarine ingredients are then added to the hot aqueous solution and mixed, followed by homogenization. Color and flavoring agents can then be added. The mixture is cooled at a rate to avoid phase separation. The purpose of the cooling step is to allow the spread to gel and set up.

Reduced fat and low fat containing spreads can also be made in a manner similar to the above-described process. In this case however, dairy ingredient(s) are added to the formulation to yield an oil-in-water emulsion. The texturizing agent serves to stabilize the water and oil phases. Again, the resultant spreads do not require gelling agents, gelatin, emulsifiers, gums, hydrocolloid such as carrageenan to adequately viscosify the product into a form which resembles margarine or butter. There is no observed phase separation in spreads made according to the present invention. The spreads do however, exhibit slight syneresis over a 3 to 4 day period of time.

Other adjunct ingredients can be employed to modify certain organoleptic and/or physical attributes. For example, the addition of a 3% fat will enhance the overall flavor as well as provide a slight increase in lubricity with a softer body. Likewise, various gums (xanthan, locust bean gum, guar gum, gum arabic, carrageenan, etc.) have been incorporated to modify texture. Low levels of xanthan gum (0.015–0.4%) have been employed to soften texture and improve spreadability of the product. Although any acidulant can be used to lower pH, lactic acid is most compatible and has been used successfully in the formulation of a high acid product. Glycerol (1–4%) has been employed to enhance lubricity without adversely affecting texture and spreadability of the finished product. Milk solids can be employed to increase the body in the finished product.

As with most food formulations, commercial processing equipment can drastically effect ultimate textural attributes of the finished product. Pilot plant trials employing ultra high temperature (UHT) processing have indicated a superior product can be produced, presumably due to the complete solubilization of sub-micron amylose crystallites before "re-setting" as the finished product. Likewise, formulation trials with "paste" material (pre-gelled starch slurry without spray drying) results in similar results with less process (i.e., hydration) steps needed in the manufacturing of the finished spread.

A non-fat, reduced fat or low fat cream cheese can be prepared according to traditional food industry processing techniques using fat containing and non-fat dairy ingredients, such as non-fat milk solids, skim milk curd and concentrated skim milk, produced for example by evaporation, by ultrafiltration treatment to provide a skim milk retentate, or by reconstitution of dried skim milk. Whole milk and reduced fat milk products can also be used. The starch based texturizing agent is incorporated into the cream cheese formulation in an amount of from about 1 to about 6 percent by weight, with about 3 percent by weight being preferred. In a preferred embodiment the cream cheese product will comprise from about 1 to about 8 weight percent of nonfat milk solids provided from the concentrated skim milk, from about 5 to about 15 weight percent of from about 0.01 to about 0.4 weight percent xanthan gum, from about 0.2 to about 1 weight percent salts and the remainder being skim milk. The amount of dairy ingredient(s) will vary depending upon the fat content of the desired product.

The mixture is subjected to high shear homogenization to provide a product resembling cream cheese in appearance and texture. Remaining ingredients are then added to the mixture such as acidulants, spices, flavors, gums, colors, salt, preservatives, vitamins and minerals. The resultant mixture can be pasteurized.

Suitable gums are hydrocolloids, such as xanthan, carrageenan, guar gum, carob bean gum, alginic acid and sodium and calcium salts thereof, gum arabic, gum tragacanth, carboxymethyl cellulose and pectin. The starch may be any food starch, such as corn starch, potato starch, rice starch or tapioca starch, each of which can be in native or pregelatinized form. Modified starches can also be used.

The invention is further illustrated by the following examples which are not to be construed as limiting in any way. All percentages used herein are by weight, dry basis, based on the final weight of the product.

EXAMPLES

Materials

Maltodextrin M040 (DE 4–7) manufactured by Grain Processing Corp.

Starch based texturizing agent derived from pregelatinized, high amylose starch (OPTAGRADE®) manufactured by Opta Food Ingredients, Inc., prepared by spray drying hot pregelatinized, high amylose starch and 25% maltodextrin (M040 from Grain Processing Corporation).

Titanium dioxide (Kowitt) manufactured by Warner Jenkins.

Keltrol F Xanthan gum manufactured by Kelco Company.

Lactic Acid (88) manufactured by ADM Corporation.

Pasteurized skim milk and heavy cream (37.6% fat) supplied by local dairies.

Disodium Phosphate manufactured by FMC Corp.

Commercial product comparison using PROMISE® Ultra Fat Free (Van Den Bergh Foods Co., Lisle, Ill.).

Example 1

No-fat Margarine

Formulation

| Ingredients | Weight/Weight Percentage |
| --- | --- |
| Water | 72.604 |
| Maltodextrin | 23.000 |
| Texturizing Agent | 3.000 |
| Salt | 1.000 |
| Titanium dioxide | 0.300 |
| Flavor (optional) | 0.030 |
| Potassium Sorbate | 0.100 |
| Sodium Benzoate | 0.100 |
| Xanthan Gum | 0.040 |
| B-carotene | 0.020 |
| BHA | 0.004 |
| Total | 100.000 |

Process

1. Heat water to 200° F. (93° C.), place in kitchen blender (use glass vessel preheated in boiling water to minimize temperature drop during processing). Slowly add starch based texturizing agent while mixing on medium speed. Once dispersed, mix on high speed for five minutes.

2. Transfer contents to a boiling water bath equipped with a bench top Silverson Homogenizer (Model L4R, small emulsion screen), maintaining 190°–200° F. (97.8°-93° C.). Slowly add remaining dry ingredients as a blend. Once dispersed, continue mixing for 5 additional minutes.

3. Slowly add color and flavor with constant mixing to evenly disperse.

4. Transfer product to ice/water bath, cool to 80° F. (26.7° C.) while mixing (400 rpm) with overhead stirrer (LIGHTNIN® mixer or equivalent).

5. Fill containers, refrigerate 3 days before evaluating.

Example 2

3% Fat Margarine-like Spreads

Formulation

| Ingredients | Weight/Weight Percentage |
| --- | --- |
| Water | 64.506 |
| Maltodextrin | 23.000 |
| Heavy Cream | 7.900 |
| Texturizing Agent | 3.000 |
| Salt | 1.000 |
| Titanium dioxide | 0.300 |
| Flavor | 0.030 |
| Potassium Sorbate | 0.100 |
| Sodium Benzoate | 0.100 |
| Xanthan Gum | 0.040 |
| B-carotene | 0.020 |
| BHA | 0.004 |
| Total | 100.000 |

Process

1. Heat water and cream mixture to 200° F. (93° C.), place in kitchen blender (use glass vessel preheated in boiling water to minimize temperature drop during processing). Add starch based texturizing agent while mixing on medium speed. Once dispersed, mix on high speed for five minutes.

2. Transfer contents to a boiling water bath equipped with a bench top Silverson Homogenizer (Model L4R, small emulsion screen), maintaining 190°–200° F. (87.8°-93° C.). Slowly add remaining dry ingredients as a blend. Once dispersed, continue mixing for 5 additional minutes.

3. Slowly add color and flavor with constant mixing to evenly disperse.

4. Transfer product to ice/water bath, cool to 80° F. (26.7° C.) while mixing (400 rpm) with overhead stirrer (LIGHTNIN® mixer or equivalent).

5. Fill containers, refrigerate 3 days before evaluating.

Example 3

Milk-based 3% Fat Spreads

Formulation

| Ingredients | Weight/Weight Percentage |
| --- | --- |
| Whole milk | 82.93 |
| Maltodextrin | 12.00 |
| Titanium Dioxide | 0.30 |
| Texturizing Agent | 2.000 |
| Salt | 1.5 |
| Flavor | 0.15 |
| Potassium Sorbate | 0.200 |
| Lactic Acid | 0.35 |
| Total | 100.000 |

Process

1. Heat milk and cream to 200° F. (93° C.), place in kitchen blender (use glass vessel preheated in boiling water to minimize temperature drop during processing). Add starch based texturizing agent while mixing on medium speed. Once dispersed, mix on high speed for five minutes.
2. Transfer contents to a boiling water bath equipped with a bench top Silverson Homogenizer (Model L4R, small emulsion screen), maintaining 190°–200° F. (87.8°–93° C.). Slowly add remaining dry ingredients as a blend. Once dispersed, continue mixing for 5 additional minutes.
3. Slowly add flavor, then acid with constant mixing to evenly disperse.
4. Transfer product to ice/water bath, cool to 80° F. (26.7° C.) while mixing (400 rpm) with overhead stirrer (LIGHTNIN® mixer or equivalent).
5. Fill containers, refrigerate 3 days before evaluating.

Sensory Analysis

Samples were paneled by consensus with three expert tasters. Evaluations were double blind. Sensory scores were based upon a scale of 0 to 9. Sensory scores (Table 1) indicated that the fat-free containing starch based texturizing agent formulation (Example 1) was smooth and fat-like with no detectable off-flavors. Superior performance was noted when compared to commercial product. Another control formulation (maltodextrin M040 to replace the starch based texturizing agent 1:1) indicated that the starch based texturizing agent is critical to the fat-like rheology. Maltodextrin alone yielded a product with no gel set and very low viscosity.

Texture Analysis

Peak force and gradient were measured using a TA-XT2 Texture Analyzer (Texture Technologies Corporation, 18 Fairview Road, Scardale, N.Y.) equipped with a two inch diameter (flat) metal probe. Peak force (maximum force [in kilograms] measured during the test) and gradient (force/distance or kilograms/meter during testing) were measured by inserting the probe to constant depth (1 mm) at a constant speed (1 mm/sec). All samples were equilibrated for three days at 40° F. (4° C.) before testing. Data (Table 1) indicated peak force and gradient values close to the 60% fat control. Comparisons to the commercial spreads indicate significant improvements in fat-like texture.

Example 4

No-fat Cream Cheese

Formulation

| Ingredients | Weight/Weight Percentage |
| --- | --- |
| Whole Milk | 48.410 |
| Skim milk | 26.730 |
| Maltodextrin | 20.000 |
| Texturizing Agent | 2.500 |
| Lactic Acid | 0.600 |
| Salt | 0.700 |
| Titanium dioxide | 0.500 |
| Disodium phosphate (duohydrate) | 0.300 |
| Flavor (optional) | 0.120 |
| Potassium Sorbate | 0.070 |
| Sodium Benzoate | 0.070 |
| Total | 100.000 |

Process

1. Heat milk to 200° F. (93° C.) place in kitchen blender (use glass vessel preheated in boiling water to minimize temperature drop during processing). Add dry ingredients while mixing on medium speed. Once dispersed, mix on high speed for five minutes.
2. Transfer contents to a boiling water bath equipped with a bench top Silverson Homogenizer (Model L4R, small emulsion screen), maintaining 190°–200° F. (87.8°–93° C.). Homogenize for three minutes on maximum speed.
3. With continued mixing, slowly add color, flavor, then acid. Hold 3 minutes to pasteurize.
4. Immediately homogenize by passing through a 2-stage Gaulin homogenizer (2,500/500 psi).
5. Transfer product to ice/water bath, cook to 80° F. (26.7° C.) while mixing (400 rpm) with overhead stirrer (LIGHTNIN® mixer or equivalent).
6. Fill containers, refrigerate 3 days before evaluating.

Sensory Analysis

Samples were paneled by consensus with three expert tasters. Evaluations were double bind. Sensory scores were based upon a scale of 0 to 9. Sensory scores (Table 2) indicated the product containing the starch based texturizing agent was smooth and fat-like. No off-flavors were detected. As with the above formulations, organoleptic and physical attributes can be modified with the same ingredients outlined above.

TABLE 1

Sensory and Anayltical Evaluation of Margarine

| Sample | Body (9 = firm) | Smoothness (9 = smooth) | Mouth drying (9 = extreme) | Fat-like Textrual Preference | TA-Xt2 Texture Analysis | |
| --- | --- | --- | --- | --- | --- | --- |
| | | | | | Peak Force (kg) | Gradient (kg/m) |
| 60% oil commercial tub margarine | 8 | 8 | 4 | 7.5 | 11 | 2286 |
| No-fat Margarine | 6 | 7 | 5 | 6.5 | 7.9 | 2390 |

TABLE 1-continued

Sensory and Anayltical Evaluation of Margarine

| Sample | Body (9 = firm) | Smoothness (9 = smooth) | Mouth drying (9 = extreme) | Fat-like Textrual Preference | TA-Xt2 Texture Analysis Peak Force (kg) | Gradient (kg/m) |
|---|---|---|---|---|---|---|
| (Example 1) Commercial No-fat Margarine | 5.5 | 6.5 | 5 | 4.5 | 2.3 | 453 |
| Control (26% MO40, No Texturizing Agent | 1 | 7 | 6 | 2 | (too weak to measure) | (too weak to measure) |

TABLE 2

Sensory Evaluation of No-fat Cream Cheese

| Sample | Body (9 = firm) | Smoothness (9 = smooth) | Mouth drying (9 = extreme) | Fat-like Textrual Preference | TA-Xt2 Texture Analysis Peak Force (kg) | Gradient (kg/m) |
|---|---|---|---|---|---|---|
| Full-fat Commercial Cream Cheese | 7 | 7 | 4 | 8 | | |
| No-fat Cream Cheese (Example 4) | 6 | 7 | 4 | 5.5 | | |
| Commercial No-fat Cream Cheese | 5.5 | 7 | 4 | 4 | | |

Equivalents

Those skilled in the art will recognize, or be able to ascertain using no more than routine experimentation, many equivalents to the specific embodiments of the invention described herein. Such equivalents are intended to be encompassed by the following claims:

I claim:

1. A fat free margarine-like spread comprising a thickening agent, one or more flavoring agents, optional dairy ingredients and does not contain emulsifiers, wherein the thickening agent consists essentially of starch and a starch based texturizing agent derived from high amylose starch that is pregelatinized under aqueous acid conditions, wherein the starch of the starch based texturizing agent has a dextrose equivalent value of less than five.

2. The spread of claim 1 wherein the starch based texturizing agent is present in an amount of from about 1.0% to about 6.0% by weight.

3. The spread of claim 1 wherein the starch based texturizing agent is derived from high amylose starch from barley, pea or corn.

4. The spread of claim 1 wherein the starch based texturizing agent comprises an excipient.

5. The spread of claim 4 wherein the excipient is maltodextrin.

6. The spread of claim 1 wherein the starch is a hydrolyzed starch, granular starch or nongranular starch.

7. The spread of claim 6 wherein the hydrolyzed starch is maltodextrin.

8. The spread of claim 1 wherein the starch based texturizing agent comprises maltodextrin and high amylose starch that has been pregelatinized under aqueous acid conditions, wherein said texturizing agent is spray dried into a powder which is retrograded and crystalline, partially retrograded and crystalline, or nonretrograded and noncrystalline.

9. A reduced fat or low fat margarine-like spread comprising a thickening agent, one or more flavoring agents, optional dairy ingredient, an oil phase which together forms an oil-in-water emulsion and does not contain emulsifiers, wherein the thickening agent consists essentially of starch and a starch based texturizing agent derived from high amylose starch that is pregelatinized under aqueous acid conditions, wherein the starch of the starch based texturizing agent has a dextrose equivalent value of less than five.

10. The spread of claim 9 wherein the starch based texturizing agent is present in an amount of from about 1.0% to about 6.0% by weight.

11. The spread of claim 9 wherein the starch based texturizing agent is derived from high amylose starch from barley, pea or corn.

12. The spread of claim 9 wherein the starch based texturizing agent comprises an excipient.

13. The spread of claim 12 wherein the excipient is maltodextrin.

14. The spread of claim 9 wherein the starch based texturizing agent comprises maltodextrin and high amylose starch that has been pregelatinized under aqueous acid conditions, wherein said texturizing agent is spray dried into a powder which is retrograded and crystalline, partially retrograded and crystalline, or nonretrograded and noncrystalline.

15. The spread of claim 9 wherein the starch is a hydrolyzed starch, granular starch or nongranular starch.

16. The spread of claim 15 wherein the hydrolyzed starch is maltodextrin.

17. A non-fat cream cheese type product comprising a thickening agent, one or more flavoring agents, dairy ingredient and does not contain emulsifiers, wherein the thickening agent consists essentially of starch and a starch based texturizing agent derived from high amylose starch that is pregelatinized under aqueous acid conditions, wherein the starch of the starch based texturizing agent has a dextrose equivalent value of less than five.

18. The cream cheese type product of claim 17 wherein the starch based texturizing agent is present in an amount of from about 1.0% to about 6.0% by weight.

19. The cream cheese type product of claim 17 wherein the starch based texturizing agent is derived from high amylose starch from barley, pea or corn.

20. The cream cheese type product of claim 17 wherein the starch based texturizing agent comprises an excipient.

21. The cream cheese type product of claim 20 wherein the excipient is maltodextrin.

22. The cream cheese type product of claim 17 wherein the starch based texturizing agent comprises maltodextrin and high amylose starch that has been pregelatinized under aqueous acid conditions, wherein said texturizing agent is spray dried into a powder which is retrograded and crystalline, partially retrograded and crystalline, or nonretrograded and noncrystalline.

23. The cream cheese type product of claim 17 wherein the starch is a hydrolyzed starch, granular starch or nongranular starch.

24. The cream cheese type product of claim 23 wherein the hydrolyzed starch is maltodextrin.

25. A reduced fat cream cheese type product comprising a thickening agent, one or more flavoring agents, dairy ingredient and does not contain emulsifiers, wherein the thickening agent consists essentially of starch and a starch based texturizing agent derived from high amylose starch that is pregelatinized under aqueous acid conditions, wherein the starch of the starch based texturizing agent has a dextrose equivalent value of less than five.

26. The cream cheese type product of claim 25 wherein the starch based texturizing agent is present in an amount of from about 1.0% to about 6.0% by weight.

27. The cream cheese type product of claim 26 wherein the starch based texturizing agent is derived from high amylose starch from barley, pea or corn.

28. The cream cheese type product of claim 26 wherein the starch based texturizing agent comprises an excipient.

29. The cream cheese type product of claim 28 wherein the excipient is maltodextrin.

30. The cream cheese type product of claim 26 wherein the starch based texturizing agent comprises maltodextrin and high amylose starch that has been pregelatinized under aqueous acid conditions, wherein said texturizing agent is spray dried into powder which is retrograded and crystalline, partially retrograded and crystalline, or nonretrograded and noncrystalline.

31. The cream cheese type product of claim 25 wherein the starch is a hydrolyzed starch, granular starch or nongranular starch.

32. The cream cheese type product of claim 31 wherein the hydrolyzed starch is maltodextrin.

* * * * *